United States Patent

Horowitz

[15] 3,637,097
[45] Jan. 25, 1972

[54] POWER-OPERATED TAILGATE WITH MAXIMUM REARWARD DISPLACEMENT BETWEEN FULLY ELEVATED AND FULLY LOWERED POSITIONS

[72] Inventor: Robert R. Horowitz, Shaker Heights, Ohio
[73] Assignee: S&H Industries, Inc., Maple Heights, Ohio
[22] Filed: Feb. 19, 1970
[21] Appl. No.: 12,677

[52] U.S. Cl. ..................................214/77 P, 214/DIG. 10
[51] Int. Cl. ..................................................B60p 1/44
[58] Field of Search..............214/77 P, 77, 75 T, 75, DIG. 10

[56] References Cited

UNITED STATES PATENTS

| | | | |
|---|---|---|---|
| 1,929,112 | 10/1933 | Hansen | 214/77 P |
| 2,527,818 | 10/1950 | Ives | 214/77 P |
| 2,820,554 | 1/1958 | Vogel et al. | 214/77 P |
| 3,362,547 | 1/1968 | Kovarik | 214/77 P |
| 3,517,838 | 6/1970 | Lugash | 214/77 P |

FOREIGN PATENTS OR APPLICATIONS

| | | | |
|---|---|---|---|
| 498,529 | 12/1953 | Canada | 214/77 P |
| 1,229,575 | 9/1960 | France | 214/77 P |
| 641,407 | 8/1950 | Great Britain | 214/77 P |

*Primary Examiner*—Albert J. Makay
*Assistant Examiner*—Robert J. Spar
*Attorney*—Isler and Ornstein

[57] ABSTRACT

A power-operated tailgate mechanism having pairs of bellcrank lever arms pivotally mounted on the bed surface of a cargo body and having their outer ends pivotally connected to a support arm which is attached to the tailgate. The relationship of the pivotal connections is such as to provide a parallelogram linkage for the purpose of maintaining the tailgate surface in a load-carrying attitude during elevating and lowering movement of the tailgate. Power means, such as an hydraulic cylinder, is connected to an actuating arm which interconnects the lever arms for simultaneous movement. Maximum rearward displacement of the tailgate occurs below the level of the bed of the cargo body.

9 Claims, 4 Drawing Figures

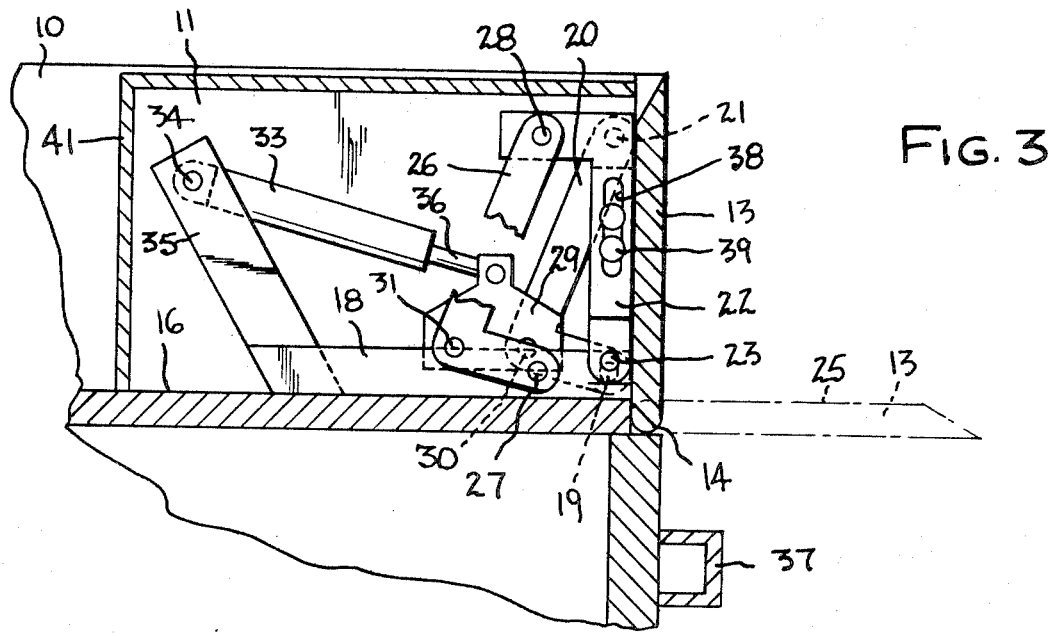
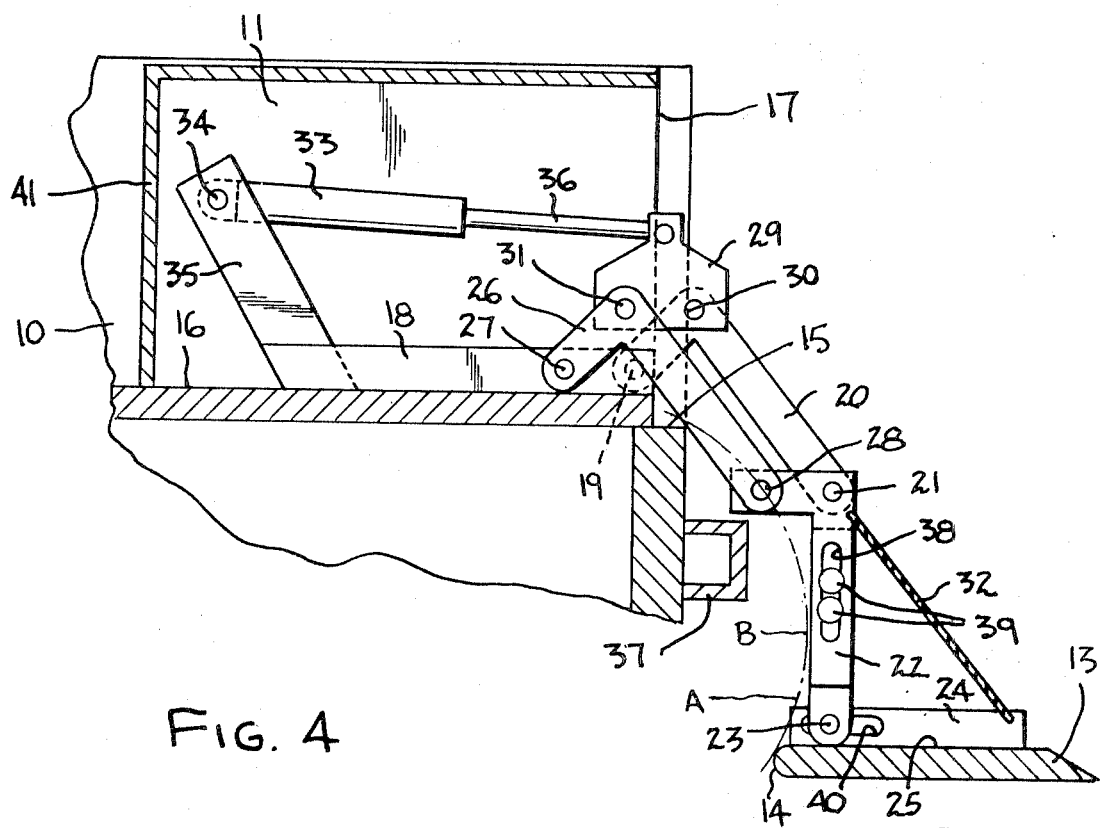

POWER-OPERATED TAILGATE WITH MAXIMUM REARWARD DISPLACEMENT BETWEEN FULLY ELEVATED AND FULLY LOWERED POSITIONS

BACKGROUND OF THE INVENTION

Power-operated tailgates for cargo bodies for the purpose of conveniently moving cargo between ground level and the cargo bed are well known in the art. Such power-operated tailgate mechanisms have heretofore been designed principally for large cargo vans and the like in which there ordinarily are no obstructions or projections extending rearwardly of the cargo body below the level of the cargo bed. Therefore, the tailgate can be moved in a substantially vertical path between its limits of position, without considering possible interference with any such projections.

With the increasing proliferation of use of the pickup truck or light delivery truck it has become increasingly desirable to provide such light delivery vehicles with power-operated tailgate mechanisms for loading and unloading functions. However, contemporaneously with the increased use of light delivery vehicles, the vehicle manufacturers have developed styling and design trends which, particularly for pickup trucks, strive to simulate passenger car design. This results in such styling features as extensions or fins on the body panels of the pickup truck which project rearwardly of the tailgate position, rearwardly projecting taillight lenses and extensive rearward projection of a low rear bumper which is often provided with a tread surface to act as a step for easily getting to the cargo bed.

Where the rearwardly projecting parts of the cargo body, such as the bumper or the body panel fins, are at a level below that of the elevated tailgate, they will ordinarily lie in the path of downward vertical movement of a powered tailgate and prevent the use of such a tailgate on this type of light delivery vehicle. The present invention overcomes this obstacle to the use of powered tailgates on such light delivery vehicles, by providing a tailgate mechanism which moves the tailgate in an orbital path which has its maximum rearward displacement below the level of the cargo bed so that the movement of the tailgate will lie outwardly or beyond the periphery of these rearwardly extending projections.

SUMMARY OF THE INVENTION

The primary object of the invention is to provide a powered tailgate elevating and lowering mechanism which will displace the tailgate rearwardly during its path of movement sufficiently to avoid interference with any rearwardly extending cargo body projections or appurtenances which lie in planes below the level of the cargo bed and would ordinarily interfere with straight vertically downward movement of the tailgate to the ground level position.

It is also desirable to provide a compact mechanism of this character which is self-storing and which will be protected from injury during normal usage.

BRIEF DESCRIPTION OF THE DRAWING

FIG. 3 is a fragmentary enlarged cross-sectional view taken as indicated on line 3—3 of FIG. 1.

FIG. 4 is a view similar to FIG. 3 but showing the position of the parts when the tailgate is in its fully lowered position.

DESCRIPTION OF THE PREFERRED EMBODIMENT

Figure 1:
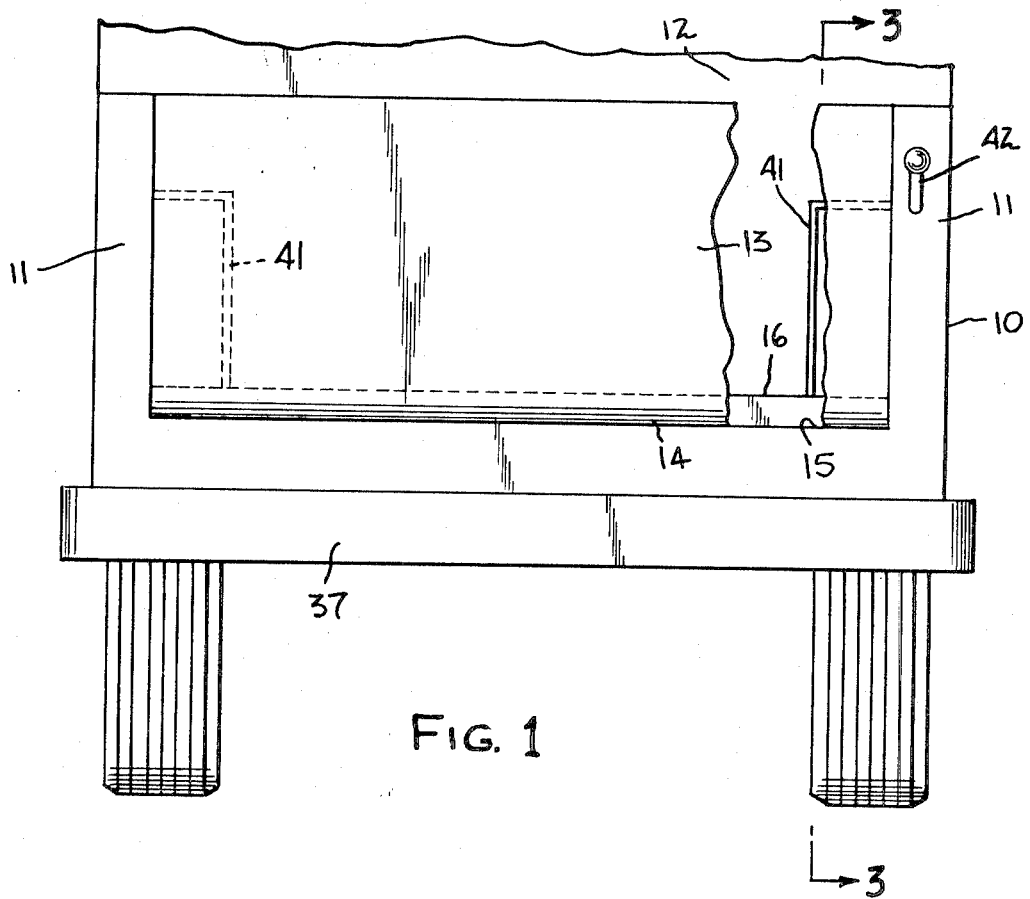
FIG. 1 is a view in rear elevation of a pickup truck equipped with a power-operated tailgate mechanism embodying the features of my invention.

FIG. 1 of the drawings illustrates the rear of a representative form of light delivery vehicle or pickup truck equipped with a power-operated tailgate mechanism having the features herein described. The cargo body 10 of the truck is provided with rigid sidewall or panels 11 which extend in a fore and aft direction. At their forward ends, the open space between the side panels 11 is sealed off by the rear of the cab structure 12. At the rearward end of the side panels, the open space is sealed off by a movable tailgate 13 which is in the form of a reinforced panel structure, which in FIG. 1 is shown in its fully closed position. As best seen in FIGS. 3 and 4 of the drawings, the tailgate 13 is received between the side panels 11 and its bottom edge 14 is preferably rounded so that the tailgate 13 can easily be swung from its fully closed position to a position in which it extends substantially horizontally rearwardly of the truck body, as shown in phantom outline in FIG. 3. To facilitate this free pivotal movement of the tailgate, its bottom edge 14 rests on a recessed ledge 15 which extends across and below the level of the surface 16 of the bed of the truck. Any suitable form of abutment 17 can be provided on each of the side panels 11 to limit the forward movement of the tailgate and properly position the tailgate on the truck body in its closed position. Any suitable form of latching means may be employed to lock the tailgate in its fully closed position, such latching means and devices being well known in the art and forming no part of the present invention.

Secured to the bed surface 16 is a base member 18 which has pivotally secured thereto, as at 19, one end of a bellcrank lever element 20, whose other or outer end is pivotally secured as at 21 to the upper end of a rigid downwardly extending support arm 22. The lower end of the support arm is secured to the tailgate 13. It will be understood that there may be circumstances in which the tailgate 13 has no other function than simply to act as a load or cargo platform which always is disposed in a substantially horizontal plane and never is swung or pivoted to the fully closed position, previously described, to enclose the rear of the cargo body. Under such circumstances, the support arm 22 can be fixedly secured to the plateform 13, as no relative pivotal movement between the member 13 and the support arm 22 is required. However, ordinarily, it is desirable and necessary that the member 13 be movable, as previously described, from its substantially horizontal load-carrying posture to a substantially vertical posture to act as a rear wall for the cargo body. For this function, the lower end of the support arm 22 is pivotally secured as at 23 to a base member 24 which is affixed to the load-carrying surface 25 of the tailgate 13 closely adjacent to the bottom edge 14.

A second bellcrank lever arm 26 is pivotally secured as at 27 to the base member 18 forwardly of the pivotal securement 19 so that the common plane of the pivotal axes 19 and 27 lie substantially parallel to the surface 16 of the cargo bed, which ordinarily is in a substantially horizontal plane. The outer end of the bellcrank lever 26 is pivotally secured as at 28 to the upper end of the support arm 22 forwardly of the pivotal connection 21. The common plane of the pivotal axes 21 and 28 is substantially parallel to the common plane of the pivotal axes 19 and 27, as previously described. The pivotal axis 28 is spaced from the axis 21 by the same distance as the axis 27 is spaced from the pivotal axis 19.

An actuating arm or member 29 is pivotally connected to the lever arm 20 as at 30 and is pivotally connected to the lever arm 26 as at 31 to interconnect the lever arms for simultaneous movement. The positional relationship of the pivotal axis 31 to the pivotal axis 30 is the same as that previously described for the positional relationship of the pivotal axis 27 to the pivotal axis 19. Thus, the lever arms 20 and 26 define a parallel linkage arrangement for uniformly maintaining the support arm 22 in a predetermined spatial posture relatively to the bed surface 16 during the simultaneous pivotal movement of the lever arms 20 and 26 about their respective pivots 19 and 27. The load-carrying posture of the surface 25 of the tailgate 13 relatively to the support arm 22 is established by providing any suitable means for limiting the extent of downward pivotal movement of the tailgate 13 relatively to the support arm 22. Such means is here shown as a flexible element 32, such as a cable or rope, but could take any one of several other well-known forms which would functionally accomplish the same purpose.

A double-acting hydraulic cylinder 33 is pivotally secured as at 34 to a rigid support element 35 which is affixed to the cargo body. The piston rod 36 of the hydraulic cylinder 33 is connected to the actuating arm 29. As the piston rod 36 is advanced by the hydraulic pressure in the cylinder, it exerts a force upon the actuating arm 29 which causes downward or clockwise pivotal movement of the lever arms 20 and 26, when viewed as in FIG. 3 or 4. Retraction of the rod 36 results in contrapivotal movement of the lever arms to cause elevation of the tailgate to the fully elevated position indicated in phantom outline in FIG. 3.

The path of movement of the edge 14 of the tailgate between its fully elevated position and its ground level or fully lowered position is indicated by the arcuate dotted line A in FIG. 4. It will be noted that the maximum rearward displacement of the tailgate 13 during such movement occurs at the point B on the line A, which is well below the level of the bed surface 16. This position or plane of maximum rearward displacement of the tailgate is such that the rearwardly projecting bumper 37 of the cargo body, which lies in a plane below the surface 16, causes no interference with the orbital path of movement of the tailgate 13. The bumper 37 is merely exemplary of any projecting portion or appurtenance of the cargo body which might project into the path of movement of the tailgate if the maximum rearward displacement of the tailgate were not preestablished to avoid such interference. Such maximum rearward displacement of the tailgate will occur when the pivotal axes 21 and 28 on the outer ends of the lever arms 20 and 26 are in horizontal alignment with their respective companion pivot points 19 and 27. The level of the tailgate 13 at this position of maximum rearward displacement is established by the effective length of the support arm 22. If the support arm 22 is made relatively short, the maximum rearward displacement of the tailgate 13 will occur at a substantially elevated position of the tailgate. On the other hand, if the effective length of the support arm 22 is made relatively long, the plane of maximum rearward displacement of the tailgate is relatively lower. The extent of such rearward displacement of the tailgate is determined by the effective length of the lever arms 20 and 26.

Figure 2:
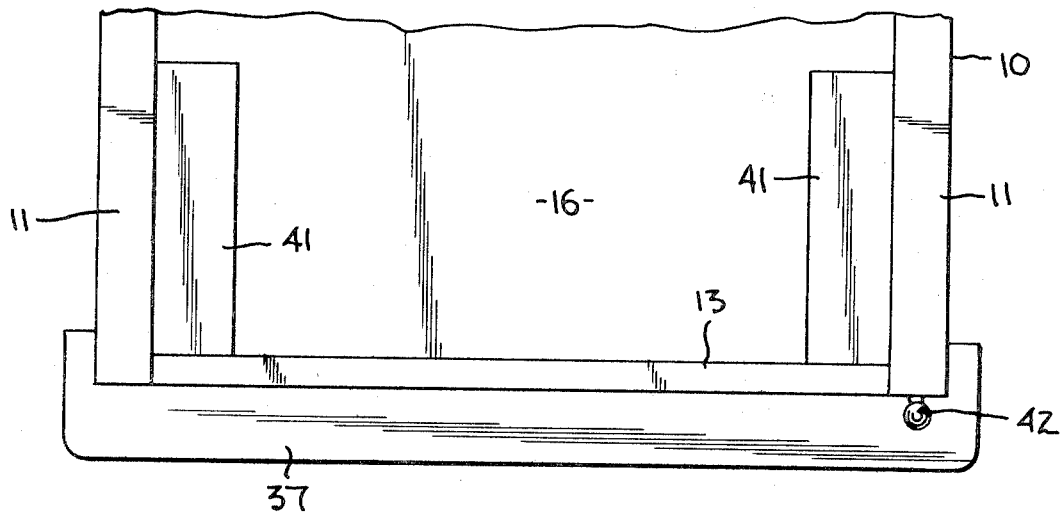
FIG. 2 is a fragmentary plan view of a portion of the vehicle shown in FIG. 1.

Although it is technically possible to manufacture and assemble the above described mechanism with such a high degree of precision and fit that only one parallel linkage mechanism would be functionally sufficient for the purpose intended, it is more practical and economically more feasible to provide a pair of such parallel linkage mechanisms in transversely spaced relationship on the cargo body, as indicated in FIG. 2 of the drawings. When connected to the tailgate in the manner described, the pair of parallelogram linkages provide the necessary stability of operation of the tailgate without the necessity for extremely close fit and high precision machining that would be required to attain such stability if only one parallelogram linkage unit were utilized. It will be understood that the second of the pair of tailgate mechanisms is a duplicate of the above described arrangement and therefore no further description of it is deemed necessary. It will also be understood that the support arm 22 may consist of two portions which are slidably adjustable relatively to each other, such as by the indicated slot 38 and bolts 39 securement to permit the above-described adjustment of length of the support arm to change the level of elevation at which maximum rearward displacement of the tailgate will occur. Likewise, the base member 24 on the tailgate may be slotted as at 40 to permit adjustment of the pivotal axis 23 at the lower end of the support arm 22 to accommodate the fully closed position of the tailgate to any adjustment made in the length of the support arm 22.

As best seen in FIG. 2 of the drawings, a sheet metal housing 41 is secured to the bed 16 of the cargo body in surrounding relationship to each of the parallelogram linkage mechanisms, but is provided with an open side facing the rear of the truck and in a plane substantially coincident with the rear end of the surface 16. The housing 41 serves to isolate the tailgate mechanism from any cargo being carried by the truck and prevents injury to such mechanism by the cargo. When the tailgate is in its fully closed position, all the described elements of the mechanism are accommodated within the housing 41 in a compact and space-saving arrangement. When the power mechanism is operated, the lever arms 20 and 26 can freely move out of the housing through the open side thereof after the tailgate has been released from its fully closed position and pivoted to its horizontal load-carrying position. When the tailgate is in its fully closed position, its load-carrying surface 25 abuts or lies closely adjacent to the open side of the housing 41 so as to overlie it and block it or seal it, thus further preventing interference of any cargo with the tailgate mechanism.

As previously indicated, the character and styling of light delivery vehicles, such as pickup trucks, is such that it does not lend itself to the installation of conventional types of underbed powered tailgate mechanisms. Such mechanisms are customarily not original equipment of the vehicle manufacturer, but are added on to the vehicle after it has been purchased by the user. By means of the above-described arrangement, such light delivery vehicles or pickup trucks can be provided with a powered tailgate mechanism which does not require the utilization of space beneath the truck bed, as is customary, but can be mounted directly on the bed surface 16 without any extensive modification of the structure of the vehicle, while not substantially reducing the available cargo-carrying capacity of the cargo body.

In operation, a suitable hydraulic circuit with appropriate dividers and valving is provided (not shown) using conventional and well-known systems or arrangements. A control knob or lever 42 is mounted on one of the side panels 11 of the cargo body or at such other location as will make it conveniently accessible to the operator. Ordinarily, the tailgate 13 will be latched in its fully closed position on the cargo body, as indicated in FIG. 3 of the drawings. When it is desired to utilize the power mechanism to elevate or lower cargo, the tailgate 13 is unlatched and swung to the horizontal load-carrying position indicated in phantom outline in FIG. 3. In this position, the surface 25 of the tailgate is disposed substantially in the plane of the bed surface 16 of the cargo body and provides an extension thereof. This horizontal position or posture of the tailgate is established by the length of the flexible element 32 which is connected from the tailgate to the support arm 22 to limit this relative pivotal movement. During this pivotal movement of the tailgate, the support arm 22 may be caused to move slightly out of the housing 41 due to a small moment arm created by the slight elevation of the pivot point 23 above the level of the bed surface 16, but the mechanism may be considered as essentially static at this point.

By proper operation of the control knob 42, fluid under pressure is directed to the cylinder 33 to cause advancement or extension of the piston rod 36 with accompanying exertion of force upon the actuating arm 29 to cause clockwise movement of the parallel linkage arms 20 and 26 downwardly about their respective pivot points 19 and 27. During the movement of the lever arms 20 and 26, the spatial posture of the support arm 22 and its attached tailgate 13 is maintained as the tailgate moves from its fully elevated position, shown in phantom outline in FIG. 3, to the fully lowered position shown in FIG. 4, such path of movement being indicated by the dotted line A in FIG. 4.

After the cargo or load has been removed from the tailgate 13, or in the case of loading, placed upon the tailgate 13 at ground level, the control knob 42 is manipulated to reverse the direction of hydraulic fluid pressure on the cylinder 33 to cause retraction of the piston rod 36. This causes counterclockwise rotation of the parallel linkage lever arms with corresponding upward movement of the tailgate to its fully elevated position. It will be understood that the control knob 42 can be manipulated to arrest the movement of the tailgate at any intermediate position of elevation, if necessary, as well as at its extremes of position.

By reason of the bellcrank configuration of the lever arms 20 and 26, the outer ends of these arms can move well below the level of the bed surface 16 without interference therewith. When the tailgate has been restored to its fully elevated position, the lever arms 20 and 26 are substantially contained within the housing 41 in a substantially vertical or upright position, as would be defined by a line joining the pivotal axes 19 and 21 or 27 and 28. The support arm 22 has also been drawn either fully or partially into the housing 41 when the tailgate is at the fully elevated position. The tailgate can now be manually swung or pivoted about the pivot point 23 to bring it to its closed position overlying the rearwardly facing opening of the housing 41, thus completing the movement of the support arm into the housing 41 and placing the vehicle in condition for ordinary transport.

Having thus described my invention, I claim:

1. In a power-operated tailgate mechanism for a cargo body having a tailgate, the combination of a first lever arm pivotally secured at its inner end to the surface of the bed of said cargo body interiorly thereof and pivotally secured at its outer end to a support arm on said tailgate, said first lever arm being pivotally movable relatively to said body through an arc in excess of 90° from an initially substantially upright position through a horizontal position of maximum rearward projection, a second lever arm pivotally secured at its inner end to the surface of the bed of said body interiorly thereof and pivotally secured at its outer end to said support arm, said tailgate being disposed rearwardly of and below said lever arms, an actuating arm interconnecting said lever arms for simultaneous pivotal movement, said pivotal connections of said second lever arm being uniformly spaced rearwardly from said like pivotal connections of said first lever arm to provide a parallelogram linkage for maintaining said tailgate in a uniform load-carrying attitude during movement of said lever arms, selectively operable power means connected to said actuating arm for effecting said movement, and said support arm being of a length to maintain said tailgate sufficiently below the level of said outer ends of said lever arms to define a corresponding path of orbital movement of said tailgate having maximum rearward displacement beyond any rearwardly projecting portions of said cargo body which are below the level of said inner ends of said lever arms.

2. A combination as defined in claim 1, wherein said support arm is pivotally secured to said tailgate and including means connecting said support arm to said tailgate for limiting downward pivotal movement of said tailgate relatively to said support arm.

3. A combination as defined in claim 2, wherein said last-named means is a flexible element.

4. A combination as defined in claim 2, wherein said support arm is provided with length-adjusting means.

5. A combination as defined in claim 2, wherein said pivotal securement of said support arm is selectively adjustable.

6. A combination as defined in claim 1, wherein said power means is a hydraulic cylinder having one end thereof anchored to said cargo body interiorly thereof.

7. A combination as defined in claim 1, wherein said lever arms are in the general form of bellcranks whereby said outer ends of said lever arms can be moved below the level of said bed surface without abutment with said bed surface.

8. A combination as defined in claim 7, including a protective housing provided on said bed surface and having a rearward-facing opening therein, said lever arms and said support arm being movable into said housing through said opening when said tailgate is in closed position relatively to said cargo body.

9. A combination as defined in claim 8, wherein said tailgate overlies said opening in said housing when said tailgate is in its fully closed position.

* * * * *